United States Patent
Kenagy et al.

(10) Patent No.: US 6,449,492 B1
(45) Date of Patent: Sep. 10, 2002

(54) APPARATUS AND METHOD FOR PREVENTING INADVERTANT OPERATION OF A MANUAL INPUT DEVICE

(75) Inventors: Jason B. Kenagy; Scott D. Beith; Marcello Lioy, all of San Diego; Josh Steinmann, Del Mar, all of CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/452,847

(22) Filed: Dec. 2, 1999

(51) Int. Cl.⁷ .................................................. H04Q 7/32
(52) U.S. Cl. ...................................... 455/550; 455/575
(58) Field of Search .................................. 455/550, 575

(56) References Cited

U.S. PATENT DOCUMENTS

| | | | | |
|---|---|---|---|---|
| 5,812,954 A | * | 9/1998 | Henriksson | 455/550 |
| 5,978,674 A | * | 11/1999 | Jackson et al. | 455/419 |

FOREIGN PATENT DOCUMENTS

| | | | | |
|---|---|---|---|---|
| EP | 0768786 | 4/1997 | ............ | H04M/1/72 |
| GB | 2234883 | 2/1991 | ............ | H04Q/7/04 |
| GB | 2314739 | 1/1998 | ............ | H04Q/7/32 |
| GB | 2320397 | 6/1998 | ............ | G08B/13/14 |
| US | 99/57880 | * 11/1999 | ............ | H04M/1/66 |
| WO | 9957880 | 11/1999 | ............ | H04M/15/00 |

* cited by examiner

*Primary Examiner*—Daniel Hunter
*Assistant Examiner*—Alan T. Gantt
(74) *Attorney, Agent, or Firm*—Philip R. Wadsworth; Charles D. Brown; Howard H. Seo

(57) ABSTRACT

A wireless communication device (100) includes a manual input device (120, 122), a key lock memory (108), and a key lock processor (104). The processor (104) accesses user-programmable parameters stored in the memory (108) that define conditions for automatically disabling and also enabling commands to be issued from the manual input device (120, 122). When the processor (104) determines that the disabling condition has been met, the manual input device (120, 122) is automatically disabled, and will remain disabled until the enabling condition is met. The wireless communication device (100) may further include a timer (130) to measure elapsed time, and a display (124) to show a label indicating the status of the manual input device (120, 122). The manual input device (120, 122) of the wireless communication device (100) may be either, or both, a conventional keypad (120) or a dual-function rotatable switch (122).

18 Claims, 2 Drawing Sheets

APPARATUS AND METHOD FOR PREVENTING INADVERTANT OPERATION OF A MANUAL INPUT DEVICE

FIELD OF THE INVENTION

The present invention is related generally to wireless communication devices and, more particularly, to a system and method of preventing inadvertent operation of a wireless communication device.

BACKGROUND OF THE INVENTION

Modern wireless communication devices, such as cellular telephones, are currently small enough to conveniently clip onto a belt, or in some cases, are even small enough to fit within a pocket or bag. At the same time, cellular telephones also include many more features that provide added convenience compared to their larger predecessors. Many, if not all, of these features are accessed and programmed through a conventional manual input device, such as a keypad or a dual-function rotatable switch, which can be used for both scrolling through a menu and selecting a particular option. One example of such a feature is user-programmable volume where the volume settings for the ringer or speaker may be programmed by shuffling through a series of menus and selecting the desired volume using the keypad or rotatable switch. Another feature typically included in conventional cellular telephones allows for programming individual keys of the keypad to recall a particular telephone number stored in memory. Thus, a telephone call to that phone number may be initiated by simply pressing a single key of the keypad.

Although the smaller size of cellular telephones and additional features provide greater portability and added convenience, the combination of the two create the possibility that operation of the cellular telephone may be inadvertently initiated. For example, a cellular telephone clipped onto a belt may be accidentally bumped against an object, causing a key of the keypad to be depressed. In the case where the key is programmed to initiate a phone call to a particular phone number, a phone call will be made inadvertently. Unless the inadvertent phone call is terminated, it may continue for quite some time. Considering that many cellular telephone services charge customers by the length of the phone call, the inadvertent phone call may result in a costly mistake. Similarly, user-programmable settings, such as ringer volume, may be accidentally reprogrammed if the manual input devices are inadvertently actuated. These problems also arise when the cellular telephone is being carried in a pocket or bag and some object is forced against a key on the keypad.

One method that has been used to prevent a key from accidentally being depressed is integrating a rigid cover into the body of the cellular telephone that may be positioned over the keypad when the cellular telephone is idle. However, such a remedy adds bulk to cellular phone and may not be effective in preventing inadvertent actuation of a dual function rotatable switch. Therefore, it can be appreciated that there is a need for a cellular telephone that is less susceptible to inadvertent operation when a manual input device of the cellular telephone is accidentally actuated. The present invention provides this and other advantages, as will be apparent from the following detailed description and accompanying figures.

SUMMARY OF THE INVENTION

The present invention is embodied in a system and method directed to automatically activating a key lock function that prevents inadvertent commands from a manual input device from initiating system operation. The system includes a manual input device having a disabled state and an enabled state, and a memory to store predetermined parameters which define conditions that will automatically place the manual input device into the disabled state and also define the conditions to return the manual input device to the enabled state. The system further includes a processor that accesses the memory and analyzes the stored parameters to automatically disable the manual input device when the first condition is satisfied, and enable the manual input device when the second condition is satisfied.

DETAILED DESCRIPTION OF THE PREFERRED EMBODIMENTS

The present invention provides a system, typically embodied in a wireless communication device such as a cellular telephone, having an automatically activated key lock function that prevents inadvertent commands from a manual input device from initiating system operation. The system can nevertheless continue receiving incoming phone calls even when the key lock function is activated. The key lock function automatically activates without the need for human intervention by the user when the system is idle and the user-programmable conditions are satisfied, and will remain activated until a deactivation condition is satisfied. Typically, the system is considered to be idle when it is powered on and ready for use, but is not engaged in an ongoing communication.

Although conventional cellular telephones often include a function similar to the key lock function of the present invention, they are not automatically activated when conditions defined by user-programmable parameters have been satisfied. In the case of the conventional cellular telephone, if the user has forgotten to manually activate the key lock function, it is still susceptible to inadvertent operation by accidental input from the manual input devices.

Figure 1:
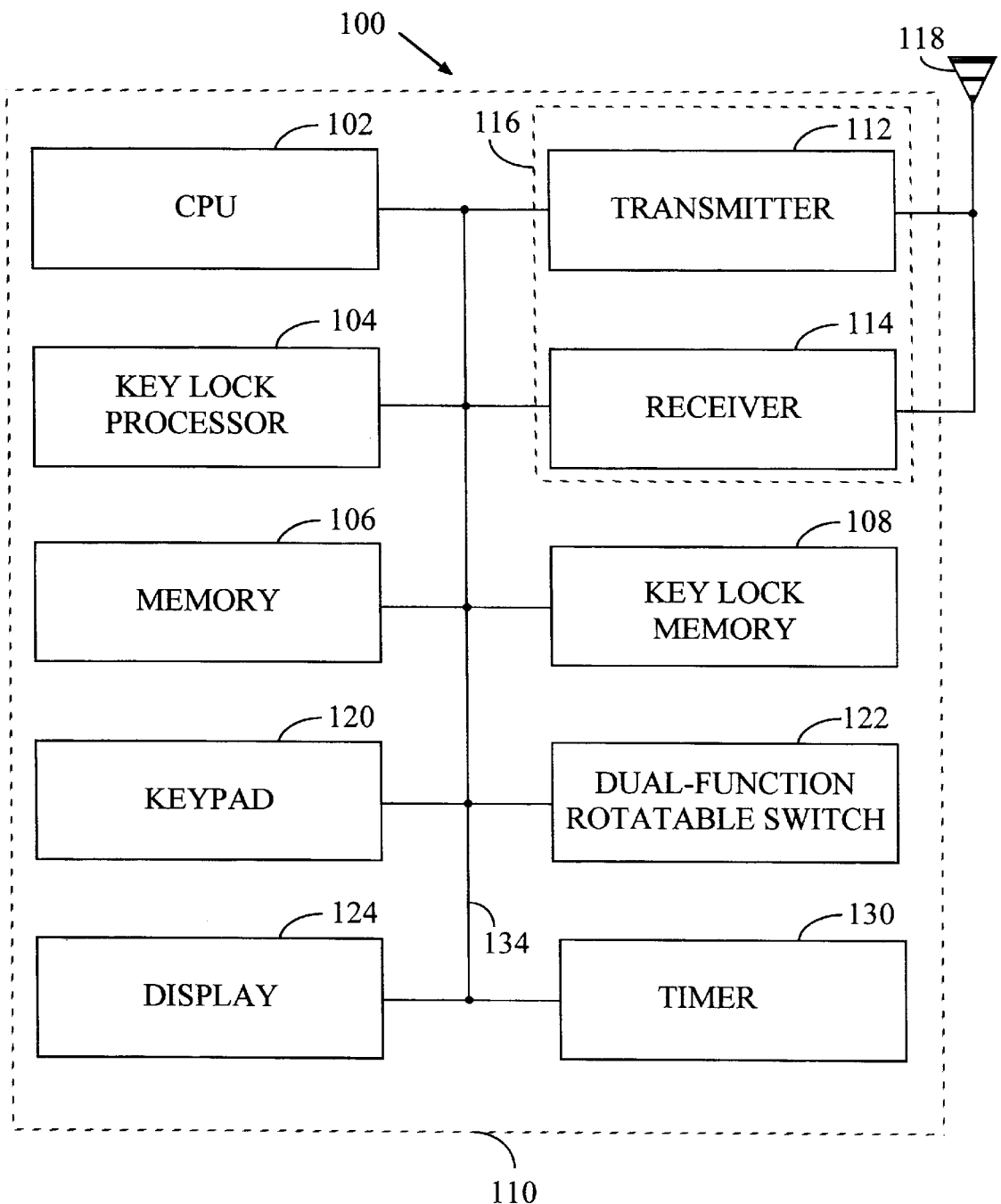
FIG. 1 is a functional block diagram of a wireless communication device of the present invention.

The present invention is embodied in a system 100 illustrated in the functional block diagram of FIG. 1. The system 100 includes a central processing unit (CPU) 102, which controls operation of the system. The CPU 102 may perform all the tasks involved with the operation of the system 100, or only a portion of them, where the remaining tasks are delegated to other processing units included in the system 100. For example, the system 100 may include, in addition to the CPU 102, a key lock processor 104 for processing key lock commands.

The system 100 also includes a memory 106, which may include both read-only memory (ROM) and random access memory (RAM). A portion of the memory 106 may also include non-volatile random access memory to store information that must be present upon powering up the system 100. The memory 106 is used generally to store instructions and data for processing by the CPU 102.

The system 100 also includes a key lock memory 108 that is devoted to storing data related to the key lock function. A portion of the key lock memory 108 may also include non-volatile random access memory, like the memory 106, so that information related to automatically activating and deactivating the key lock function do not need to be reprogrammed each time the system 100 is powered on. Alternatively, the key lock memory 108 may be part of the memory 106.

The system 100 also includes a housing 110 that contains a transmitter 112 and a receiver 114 to allow transmission and reception of data, such as audio communications, between the system 100 and a remote location, such as a cell site controller (not shown). The transmitter 112 and receiver 114 may be combined into a transceiver 116. An antenna 118 is attached to the housing 110 and electrically coupled to the transceiver 116. The operation of the transmitter 112, receiver 114, and antenna 118 is well known in the art and need not be described herein. Although FIG. 1 illustrates the antenna 118 as extending from the housing 110, some designs may include an internal antenna that is contained completely within the housing. However, the transmitter 112, receiver 114, and antenna 118 operate in a conventional manner regardless of the location of the antenna.

A manual input device, such as a keypad 120, is attached to the housing 106 for operation by the user in a conventional manner. The keypad 120 provides a convenient input device by which destination telephone numbers and commands may be entered by the user. The system 100 may further include other additional manual input devices, such as a dual-purpose rotatable switch 122 which allows the user to scroll through operation menus as well as select menu options. In a known embodiment, the switch 122 is rotated by the user to select a particular function or setting. The selected function or setting may be activated by depressing the switch 122 like a pushbutton switch. As will be described in more detail below, the automatically activated key lock function protects against inadvertently initiating system operation by locking out some or all of the manual input devices of the system 100.

The system 100 also includes a display 124 that may conveniently used to display instructions to the user as well as user-entered data, such as destination telephone numbers and alphanumeric text. The information shown on the display 124 provides visual cues that assist the user in the operation of the system 100. In an exemplary embodiment of the system 100, the display 124 will display information related to the key lock function, such as, whether the key lock function is activated or deactivated.

The system 100 also includes a timer 130, which may be typically included in the CPU 102. As will be discussed in greater detail below, the system 100 uses the timer 130 for measuring a length of time before automatically activating the key lock function.

The various components of the system 100 are coupled together by a bus system 134, which may include a power bus, control signal bus, and status signal bus in addition to a data bus. However, for the sake of clarity, the various buses are illustrated in FIG. 1 as the bus system 134.

The system 100 also includes many other components found in a conventional cellular telephone, but for the sake of clarity are omitted from FIG. 1. For example, those of ordinary skill in the art will recognize that the system 100 also includes several conventional components, such as a speaker and microphone to provide two-way audio communication, and a battery to provide power to the system 100.

The conditions for automatically activating the key lock function, as well as for deactivating the key lock function, are user programmed and stored in the key lock memory 108. Programming is typically accomplished through use of the keypad 120 or the switch 122. The key lock deactivation condition is typically a code that represents a sequence of keystrokes on the keypad 120, and will hereafter interchangeably be referred to as the "deactivation code" or deactivation condition. After the parameters defining the key lock activation and deactivation conditions have been programmed, the key lock processor 104 accesses the parameters stored in the key lock memory 108 and analyzes them to establish the activation and deactivation conditions for the key lock function. When the key lock processor 104 determines that the activation condition have been met, the key lock function is automatically activated and will remain activated until the deactivation code is provided.

As mentioned previously, the system 100 can still receive incoming phone calls when the key lock function is activated. This may require that particular keys of the keypad remain functional while the key lock function is activated. For example, a SEND key may remain functional so that when it is depressed when an incoming phone call is being received, the system 100 will answer the incoming phone call. Alternatively, the system 100 may still be able to initiate outgoing calls for emergency phone numbers, such as 911, when the key lock function is activated.

Once the key lock function has been activated, inadvertent or errant operation of the keypad 120 or the switch 122 will not initiate operation of the system 100. Inhibiting operation initiated by commands from the keypad 120 or 122 may be implemented in a conventional manner. The practical effect of the key lock function is that the key lock processor 104 automatically places the manual input devices into either a disabled or enabled state. Those ordinarily skilled in the art will recognize that the input devices are not functionally disabled or enabled, but are merely disabled from initiating system operation. For example, inadvertently initiating a phone call to a particular number by accidentally pressing a programmed key cannot occur because the keypad 120 is effectively disabled. However, the keypad 120 is still capable of receiving the deactivation code as input. When the key lock function is deactivated, the keypad 120 returns to an enabled state where system operation may again be initiated through operation of either the keypad 120 or switch 122. Thus, the keypad 120 appears to be in a disabled state, from an operational standpoint, when the key lock function is activated, and the keypad 120 will return to an enabled state once the key lock function is deactivated.

The key lock activation conditions may be programmed by the user in several manners, such as, a user-programmable time after which the key lock function activates. In one embodiment, user programming is carried out by selecting from a choice of preprogrammed activation conditions presented to the user. These may include such conditions as automatically activating the key lock function: (1) after the system 100 becomes idle and 15 seconds of no input from either the keypad 120 or the switch 122; (2) after the system 100 becomes idle and 30 seconds of no input from either the keypad 120 or the switch 122; (3) when the system 100 is removed from a hands-free accessory cradle; or (4) immediately when the system 100 is first powered on. The time delays in conditions (1) and (2) are examples only and are not intended to limit the present invention. After the desired condition is user selected, the parameters will be stored in the key lock memory 108 for access by the key lock processor 104.

In another embodiment, the key lock activation condition may be user selected from choices provided by the system 100, in addition to offering an option for user programming a particular delay time before automatically activating the key lock function. Thus, if none of the preset selections are desired, the precise time following the last input by either the keypad 120 or the switch 122 may be programmed and stored in the key lock memory 106. For example, if none of the three options presented above are satisfactory, a delay time of 45 seconds may be programmed by the user.

Programming the deactivation code may be accomplished in a manner similar to programming the activation conditions. For example, a default deactivation code may be provided by the system 100. The default code may be shown on the display 124 when the key lock function is activated in order to assist user deactivation. The deactivation code may be also user selected from several available predetermined codes. Another option would allow a particular deactivation code to be user programmed. Such an option provides an automatically activated security-type function that prevents both unauthorized and inadvertent operation of the system 100. If the key lock function is programmed to be activated when the system 100 is removed from a hands-free accessory cradle, it may also conveniently be programmed to be deactivated when the system 100 is placed in the hands-free accessory cradle.

Figure 2:
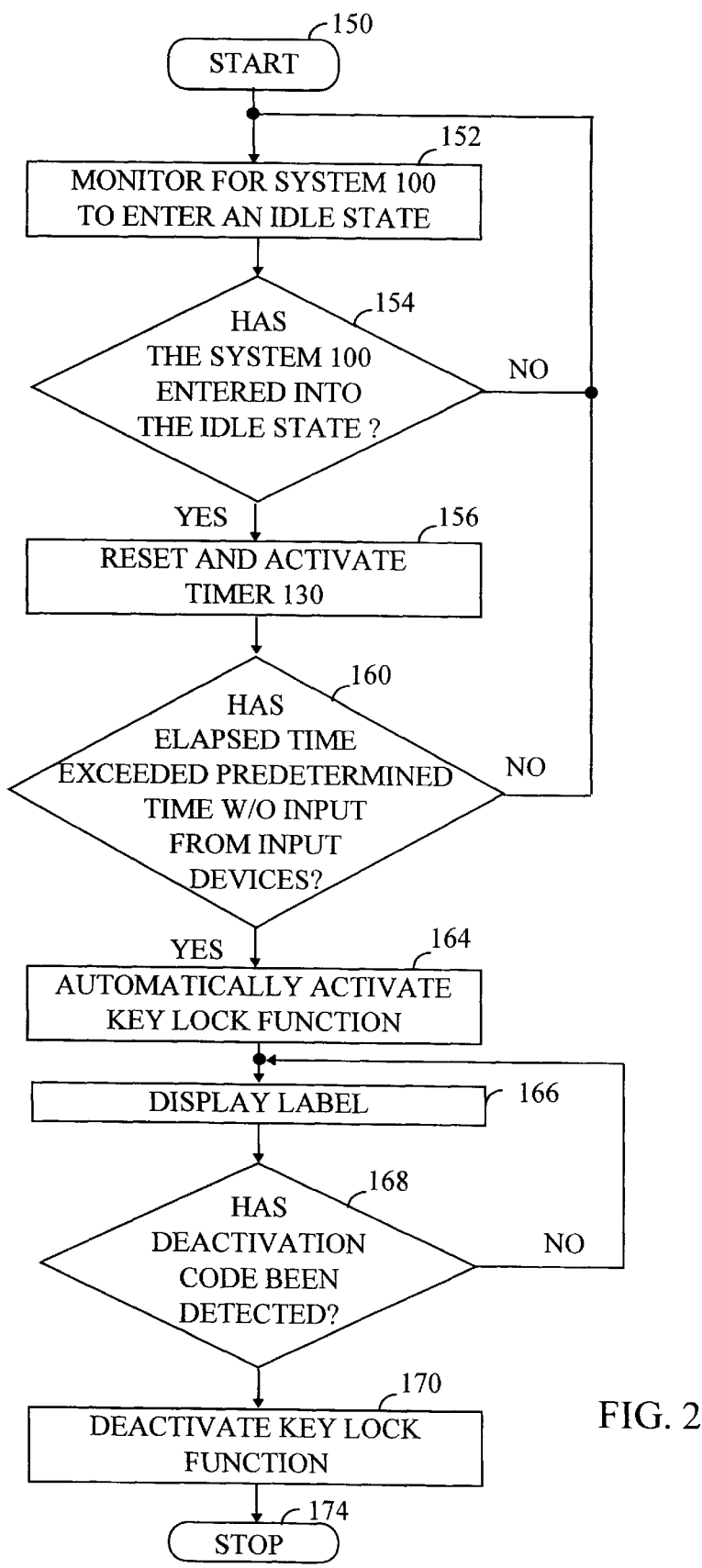
FIG. 2 is a flowchart illustrating operation of the wireless communication device of FIG. 1.

The operation of the system 100 is described in further detail in the flowchart of FIG. 2. At a start 150, the parameters defining the condition under which the key lock function is automatically activated have already been programmed into the key lock memory 108. In the present example, the user selected activation conditions for the key lock function to automatically activate is after the system 100 becomes idle and 30 seconds after the last input from the keypad 120 or the switch 122. The key lock processor 104 accesses these parameters from the key lock memory 108 and begins monitoring for the system 100 to enter an idle state at step 152. When the key lock processor 104 detects that the system 100 has entered into the idle state at step 154, the key lock processor 104 resets and activates the timer 130 to begin measuring an elapsed time at step 156.

At step 160, the key lock processor 104 waits for the elapsed time to exceed the predetermined time programmed in the key lock memory 108. In the present example, the predetermined time before activating the key lock function is 30 seconds. If an input is detected from either the keypad 120 or the switch 122 prior to the elapsed time reaching 30 seconds, the key lock processor 104 must again wait until the system 100 returns to the idle state to begin measuring the elapsed time. A long delay before returning to the idle state is usually indicative of the system 100 being user operated. However, if the system 100 quickly returns to the idle state in step 154, this most likely indicates that the input from the keypad 120 or the switch 122 was inadvertent. In the case of an inadvertent input, the key lock processor 104 will promptly detect the system 100 returning to the idle state and again reset and activate the timer 126 to begin measuring the elapsed time.

If the elapsed time reaches 30 seconds without any input from the keypad 120 or the switch 122, the key lock processor 104 activates the key lock function at step 164. Once the key lock function is activated, the deactivation code must be detected before any input from the keypad 120 or switch 122 can initiate operation of the system 100. As mentioned previously, the practical effect of the key lock function is that the key lock processor 104 automatically places the manual input devices into either a disabled or enabled state, that is, the input devices are not functionally disabled or enabled, but are merely disabled from initiating system operation. For example, the CPU 102 may simply ignore data from the manual input devices if the key lock function is enabled unless the data corresponds to the deactivation code.

As mentioned previously, the deactivation code may be the default code provided by the system 100, or a user-programmed code. At step 166, the key lock processor 104 also directs the display 124 to display a message or symbol that indicates the key lock function is currently activated. If the deactivation code has been programmed by the user, the deactivation code may be shown on the display 124 as well.

At step 168, the key lock processor awaits the receipt of the deactivation code. Upon receiving an input from the keypad 120, the key lock processor 104 will determine if the deactivation code is provided. If not, the key lock processor 104 will continue to block any input from the keypad 120 and the switch 122 from initiating operation of the system 100. When the deactivation code is finally detected by the key lock processor 104, the key lock function is deactivated in step 170 and operation of the system 100 resumes.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A wireless communication device, comprising:
   a manual input device to sense user operation thereof, the manual input device having a disabled stale and an enabled state;
   a memory to store predetermined parameters defining a first condition upon which the manual input device is automatically placed into the disabled state and a second condition upon which the manual input device is placed into the enabled state; and
   a processor coupled to the memory to receive and analyze the predetermined parameters, the processor automatically placing only the manual input device in the disabled state upon determining that the first condition has been satisfied and to place the manual input device in the enabled state upon determining the second conditions has been satisfied.

2. The wireless communication device of claim 1, further comprising a timer to measure elapsed time, the first condition being satisfied when the elapsed time exceeds a predetermined time.

3. The wireless communication device of claim 2 wherein the predetermined time is user-programmable by operation of the manual input device and stored in the memory.

4. The wireless communication device of claim 1, further comprising a display coupled to the processor to display a first label when the manual input device is placed into the disabled state and a second label when the manual input device is placed into the enabled state.

5. The wireless communication device of claim 1 wherein the manual input device comprises a keypad.

6. The wireless communication device of claim 5 wherein the predetermined parameters stored in the memory that define the second condition comprise a predetermined sequence of keystrokes of the keypad.

7. The wireless communication device of claim 6 wherein the predetermined sequence of keystrokes is user-programmable by operation of the keypad.

8. The wireless communication device of claim 1 wherein the manual input device comprises a user rotatable switch mechanism.

9. The wireless communication device of claim 1 wherein the manual input device includes a power switch, and the first condition is satisfied by powering on the wireless communication device.

10. The wireless communication device of claim 1 wherein the first condition is satisfied by removing the wireless communications device from a hands-free accessory cradle, and the second condition is satisfied by placing the wireless communications device into the hands-free accessory cradle.

11. A method of preventing inadvertent operation of a manual input device of a wireless communication device, the method comprising:

automatically disabling only the manual input device from initiating operation of the wireless communication device when a user-programmable first condition is satisfied; and enabling the manual input device to initiate operation of the wireless communication device when a second condition is satisfied.

12. The method of claim 11 wherein automatically disabling the manual input comprises:

determining whether the wireless communication device is in an idle state;

measuring an elapsed time from when the cell phone enters the idle state; and disabling the manual input when the elapsed time exceeds a predetermined time.

13. The method of claim 12 wherein the predetermined time is user-programmable.

14. The method of claim 11 wherein automatically disabling the manual input comprises immediately disabling the manual input device when the wireless communication device is first powered on.

15. The method of claim 11 for use with a wireless communication device having a display, the method further comprising displaying a label indicative of the manual input device being automatically disabled.

16. The method of claim 11 for use with a wireless communication device having a keypad as the manual input device, wherein enabling the keypad comprises determining whether a predetermined sequence of keystrokes on the keypad has been provided.

17. The method of claim 16 wherein the predetermined sequence of keystrokes is user-programmable.

18. The method of claim 11 wherein the first condition is satisfied by removing the wireless communications device from a hands-free accessory cradle, and the second condition is satisfied by placing the wireless communications device into the hands-free accessory cradle.

* * * * *